(12) United States Patent
Akopian et al.

(10) Patent No.: US 7,124,352 B2
(45) Date of Patent: Oct. 17, 2006

(54) TRACKING A CODE MODULATED SIGNAL

(75) Inventors: David Akopian, Tampere (FI); Harri Valio, Kämmenniemi (FI)

(73) Assignee: Nokia Corporation, Espoo (FI)

( * ) Notice: Subject to any disclaimer, the term of this patent is extended or adjusted under 35 U.S.C. 154(b) by 487 days.

(21) Appl. No.: 10/735,285

(22) Filed: Dec. 12, 2003

(65) Prior Publication Data

US 2005/0229068 A1    Oct. 13, 2005

(51) Int. Cl.
*H03M 13/00* (2006.01)
*G06F 7/02* (2006.01)

(52) U.S. Cl. ...................... 714/819; 375/150

(58) Field of Classification Search ............... 714/819; 375/148, 150, 152; 701/213
See application file for complete search history.

(56) References Cited

U.S. PATENT DOCUMENTS 5,818,868 A * 10/1998 Gaudenzi et al. .......... 375/152
6,249,542 B1 * 6/2001 Kohli et al. ................ 375/150
6,366,938 B1   4/2002 Levison et al. ............. 708/422

OTHER PUBLICATIONS

U.S. Appl. No. 10/406,152, filed Apr. 1, 2003, Title: Determining the Correlation Between Received Samples and Available Replica Samples.
PCT International Application No. PCT/IB02/04420, International Filing Date: Oct. 24, 2002, Title: Determination of the Correlation Phase Between a Signal and a Replica Sequence.

* cited by examiner

*Primary Examiner*—Guy J. Lamarre

(57) ABSTRACT

To reduce the complexity of the correlation in a correlation based tracking of a code modulated signal received at a receiver, received samples and available replica samples are aligned to each other and the positions of the samples in the received signal and in the replica code sequences are grouped, each group comprising all positions at which the composition of the values of the samples of all of the replica code sequences is similar. The values of the received samples which are associated to a respective group are combined separately for each group to obtain a respective intermediate result. Then, a correlation value is determined for each replica code sequence by combining the intermediate results obtained for all groups separately for each replica code sequence, taking into account the values of the samples of the replica sequences in the respective group.

14 Claims, 6 Drawing Sheets

TRACKING A CODE MODULATED SIGNAL

FIELD OF THE INVENTION

The invention relates to a method, a processing unit, a system and a software program product, either supporting a correlation based tracking of a code modulated signal received at a receiver.

BACKGROUND OF THE INVENTION

A tracking of received code modulated signals may be required, for example, in CDMA (Code Division Multiple Access) spread spectrum communications.

For a spread spectrum communication in its basic form, a data sequence is used by a transmitting unit to modulate a sinusoidal carrier and then the bandwidth of the resulting signal is spread to a much larger value. For spreading the bandwidth, the single-frequency carrier can be multiplied for example by a high-rate binary pseudo-random noise (PRN) code sequence comprising values of −1 and 1, which code sequence is known to a receiver. Thus, the signal that is transmitted includes a data component, a PRN component, and a sinusoidal carrier component. A PRN code period comprises typically 1023 chips, the term chips being used to designate the bits of the code conveyed by the transmitted signal, as opposed to the bits of the data sequence.

A well known system which is based on the evaluation of such code modulated signals is GPS (Global Positioning System). In GPS, code modulated signals are transmitted by several satellites that orbit the earth and received by GPS receivers of which the current position is to be determined. Each of the satellites transmits two microwave carrier signals. One of these carrier signals L1 is employed for carrying a navigation message and code signals of a standard positioning service (SPS). The L1 carrier signal is modulated by each satellite with a different C/A (Coarse Acquisition) Code known at the receivers. Thus, different channels are obtained for the transmission by the different satellites. The C/A code, which is spreading the spectrum over a 1 MHz bandwidth, is repeated every 1023 chips, the epoch of the code being 1 ms. The carrier frequency of the L1 signal is further modulated with the navigation information at a bit rate of 50 bit/s. The navigation information, which constitutes a data sequence, can be evaluated for example for determining the position of the respective receiver.

A receiver receiving a code modulated signal has to have access to a synchronized replica of the employed modulation code, in order to be able to de-spread the data sequence of the signal. For de-spreading the data sequence, a synchronization has to be performed between the received code modulated signal and an available replica code sequence. Usually, an initial synchronization called acquisition is employed for searching a satellite. Thereafter, a fine synchronization called tracking is employed for keeping the found satellite signal locked. In both synchronization scenarios, a correlator is used to find the best match between the replica code sequence and the received signal and thus to find their relative shift called code phase.

A correlator aligns an incoming signal with a replica code sequence with different assumptions on the code-phase. The correlator then multiplies the elements elementwise and integrates the resulting products to obtain a correlation value for each code-phase. If the alignment is correct, the correlation will be higher than in the case of a misalignment. Thus, the correlation peak is an indication of the correct code-phase. The search by the correlator can be performed in addition with different assumptions on an additional frequency modulation of the received signal.

Compared to the acquisition, the tracking searches in a smaller frequency range and code phase area. Still, the receiver usually comprises several tens of tracking channels. Only simple operations are shared between the different channels when searching in parallel for several frequencies, for example for a compensation of sinusoidal modulation remaining after a carrier wipe-off. Therefore, also tracking correlators are rather complex.

The tracking correlators of known receivers are implemented in hardware, and it is desirable to reduce the complexity of these correlators.

SUMMARY OF THE INVENTION

It is an object of the invention to reduce the complexity of parallel correlators which are employed for tracking acquired code modulated signals.

It is further an object of the invention to reduce the computational load required in the tracking of acquired code modulated signals.

A method is proposed for supporting a correlation based tracking of a code modulated signal received at a receiver. The samples of the received signal and of at least one available replica code sequence are aligned to each other. Further, the positions of the samples in the received signal and in the at least one replica code sequence are grouped, each group comprising all positions at which the composition of the values of the samples of all of the at least one replica code sequence is similar. The proposed method comprises as a first step combining the values of the samples of the received signal which are associated by their positions to a respective group separately for each group to obtain a respective intermediate result. As a second step, the proposed method comprises determining a correlation value for each of the at least one replica code sequence by combining the intermediate results obtained for all groups separately for each of the at least one replica sequence, taking into account the values of the samples of the at least one replica sequence in the respective group.

The receiver receiving the code modulated signal can be for example a part of a mobile terminal, and it can be for example inside the mobile terminal. This means that the receiver can be for example a separate module or be implemented for example inside the mobile terminal. However, the receiver does not have to be combined with a mobile terminal. It can be for instance as well a normal GPS receiver which does not have a mobile terminal inside the same device.

Further, a corresponding processing unit and a corresponding system are proposed, each comprising a first combining portion for generating the intermediate results and a second combining portion for determining the correlation values in accordance with the proposed method.

The proposed processing unit can be for instance a tracking correlator, which may be included in a receiver or in some other apparatus which is adapted to receive from the receiver samples of the code modulated signal received at the receiver. Alternatively, the processing unit can be given for example by the receiver itself or by some other apparatus which is adapted to receive from the receiver samples of the code modulated signal received at the receiver. The proposed system may comprise for example at least a receiver and an apparatus which is adapted on the one hand to receive from the receiver samples of the code modulated signal and on the other hand to carry out the proposed method. Such an apparatus can be for instance a mobile terminal which comprises the receiver or which is connected to the receiver or a network element of a mobile communication network which is able to communicate with such a mobile terminal.

Finally, a software program product is proposed, in which a software code for supporting a correlation based tracking of a code modulated signal received at a receiver is stored, wherein samples of the received signal and samples of at least one available replica code sequence are aligned to each other and wherein positions of the samples in the received signal and in the at least one replica code sequence are grouped, each group comprising all positions at which the composition of values of the samples of all of the at least one replica code sequence is similar. The software code realizes the steps of the proposed method when running in a processing unit.

The invention is based on the consideration that in each available replica code sequence checked in a tracking process, the same sample values will occur several times. In case of several replica code sequences, also a particular composition of sample values of all replica code sequences at one position will usually occur various times, if the number of replica code sequences is not too big and if the replica code sequence is a pseudorandom code sequence. It is therefore proposed that similar compositions of replica code sequence samples are grouped by the positions of the samples. The received samples are first combined within the groups, i.e. those received samples which are at positions associated to the same group are combined to form intermediate results. These intermediate results can be for example subsums obtained by accumulating the respective samples in an intermediate stage, but equally other calculation results. The intermediate results can then be combined to form a correlation value for each replica code sequence with a significantly reduced processing effort.

It is an advantage of the invention that it allows a savings in computations when processing in parallel several replica code sequences for tracking an acquired code modulated signal. The computations can be reduced for example to half, a third, or a fourth of the number of computations required for a conventional tracking. The invention can also be combined with known methods to save computations, for example when processing multiple frequencies. By such a combination, a significant reduction of the computational load can be achieved. As a result, also the power consumption is reduced.

It is further an advantage of the invention that the complexity of an employed tracking correlator can be reduced by sharing the same hardware and intermediate results for processing several replica code sequences. This will reduce the gate count and the silicon area, which is of particular advantage for realizing a tracking in cellular phones and other mobile terminals.

It is to be noted that the invention can be employed for a parallel processing of different replica code sequences, but equally for reducing the number of computations for the processing of a single replica code sequence. In the latter case, the replica code sequence is partitioned into sections forming at least two different groups, i.e. each composition of samples comprises only a single sample. The calculation of the correlation value is then the same as for one of several replica code sequences.

In case of a parallel processing, the invention can be employed for performing the tracking correlation in parallel for several replicas which correspond to the code employed by several transmitting units, or in parallel for several code phases of a single replica which corresponds to the code employed by a single transmitting unit. The checked replica code sequences can thus originate from different replicas or from different code phases of a single replica.

The positions of the samples can be grouped in different ways. In a first preferred approach, each group comprises all positions at which the composition of the values of the samples of all replica code sequences is identical. In a second preferred approach, each group comprises all positions at which the composition of the differences between the values of the samples of all replica code sequences except for one selected replica code sequence and the value of the sample of the selected replica code sequence is identical. When combining the intermediate results for obtaining the correlation value for a particular replica code sequence, the way in which the groups are formed has to be taken into account.

The invention can moreover be employed with any type of code, since it is possible to form groups with similar replica samples for any code. A particularly simple processing is obtained for binary codes, for example in the case of a BPSK (binary phase shift keying) modulation of the received signals, where the received samples and the samples of the replica code sequences have values of $(-1, +1)$. In the latter case, each received sample has to be multiplied either to $+1$ or $-1$ in the correlation process. With K replica code sequences, there are e.g. $2^K$ groups of replica samples with the same sign distribution for all replica code sequences at a specific sample position, or e.g. $2^{K-1}$ groups of replica samples with the same distribution of sign changes compared to the sample of a selected one of the replica code sequences at a specific sample position. Since samples received for each of the groups are combined first within their groups, and the outputs of this operation are then combined differently for each replica code sequence, several replica code sequences are processed with the computational effort of one.

The invention may be used in tracking for determining the code phase and the frequency of a remaining complex sinusoidal modulation of a received signal, i.e. of the sinusoidal modulation which remains after the carrier has been wiped off from the received signal based on the known nominal carrier frequency. The code phase is determined according to the peaks of a cross-correlation function, the correlation being calculated at initial code wipe-off stages. The processing for weak signals requires additional coherent and non-coherent integrations. The invention can therefore also be used as a building block for other methods implementing different scenarios of coherent and/or non-coherent processing for possible multiple frequency candidates.

The invention can be implemented in hardware or in software. The invention can be implemented in particular in accordance with the implementation of the employed correlator.

The invention can further be employed in particular, though not exclusively, for CDMA spread spectrum receivers, for instance for a receiver of a positioning system like GPS or Galileo.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE INVENTION

Figure 1:
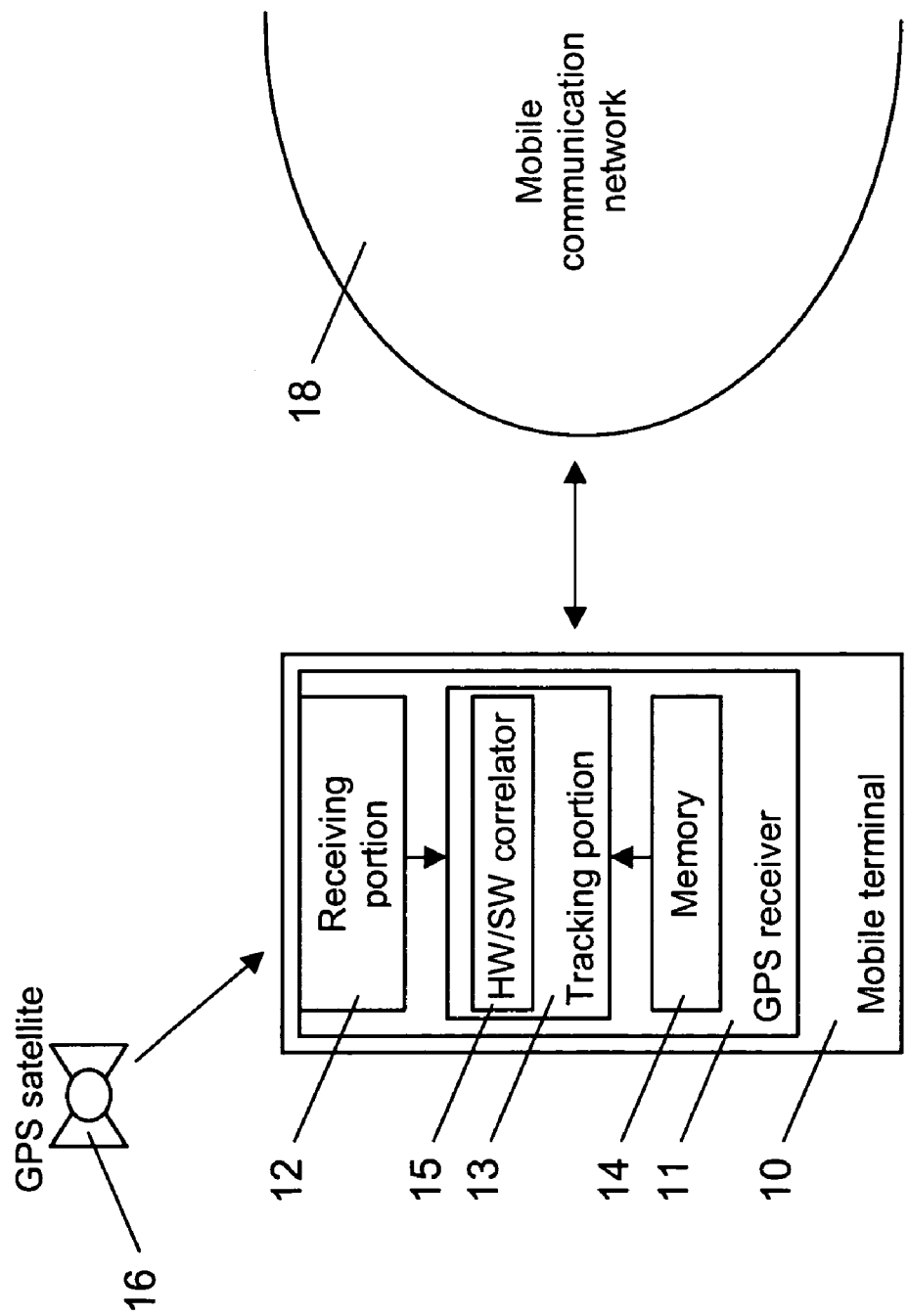
FIG. 1 presents a system in which the invention can be implemented.

Two exemplary embodiments of the invention will be described, which are implemented in a GPS receiver 11 of a positioning system as presented in FIG. 1.

The system comprises a plurality of GPS satellites 16, a mobile terminal 10 including the receiver 11, and a mobile communication network 18. The receiver 11 includes a receiving portion 12, a tracking portion 13 and a memory 14.

The memory 14 stores a plurality of replica code sequences, each replica code sequence corresponding to the code sequence employed by a respective GPS satellite 16. The GPS satellites 16 use BPSK (binary phase shift keying) PRN codes consisting of only +/−1. Therefore, also the stored replica code sequences are binary sequences. Alternatively, the replica samples could be generated in real-time. When a satellite signal, which has previously been acquired by the receiver 11 in a known manner, reaches the receiver 11, the receiving portion 12 receives this satellite signal, wipes off the known carrier frequency from the received signal, and provides consecutive samples to the tracking portion 13.

The tracking portion 13 employs a correlator 15 for calculating the correlation between the samples of a received signal and the available replica code sequences, to which the received samples are aligned. This process is carried out for all to be searched code phases and will be explained in more detail below. The highest correlation value obtained identifies the satellite by which the received signal was transmitted and the code phase the received signal has. The code phases which are to be searched are delimited by the preceding acquisition of the received signal. The correlator 15 can be implemented in software or in hardware.

The mobile terminal 10 comprising the GPS receiver 11 is able to communicate with the mobile communication network 18. This may be exploited in a known manner to provide assistance data from the mobile communication network 18 to the GPS receiver 11, for instance for the acquisition of satellite signals. Alternatively or in addition, the mobile terminal 10 may transmit information from the GPS receiver 11 to the mobile communication network 18 so that at least part of the processing described in the following could be carried out as well in the mobile communication network 18.

Figure 2:
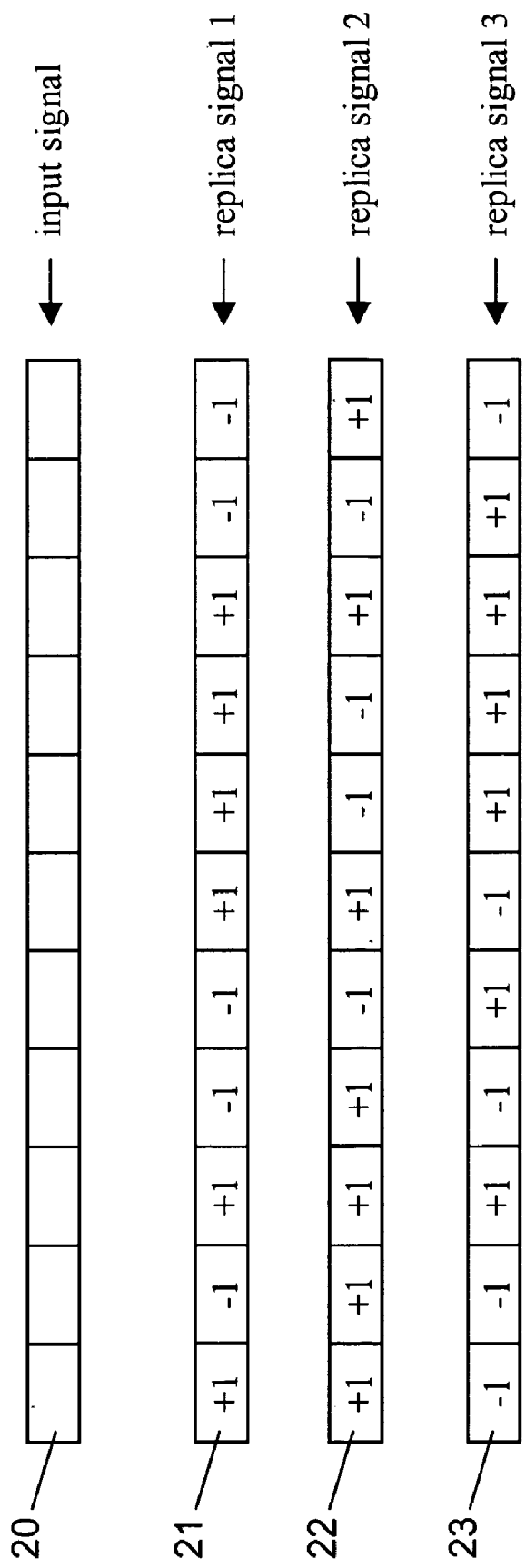
FIG. 2 illustrates an exemplary distribution of sample values in three replica code sequences.

FIG. 2 illustrates the alignment of received samples and the samples of three replica sequences, which are used for example in one integration cycle.

A first row 20 presents samples of a received signal. A second row 21 presents samples of a first replica code sequence stored in the memory 14 of the receiver 11. A third row 22 presents samples of a second replica code sequence stored in the memory 14 of the receiver 11. A fourth row 23 presents samples of a third replica code sequence stored in the memory 14 of the receiver 11. While the signs of the samples of a received signal change in an unknown manner, the sign usage for each sample of the stored replica code sequences is known to the receiver.

The first embodiment of the invention will now be described with reference to FIGS. 3 and 4.

Figure 3:
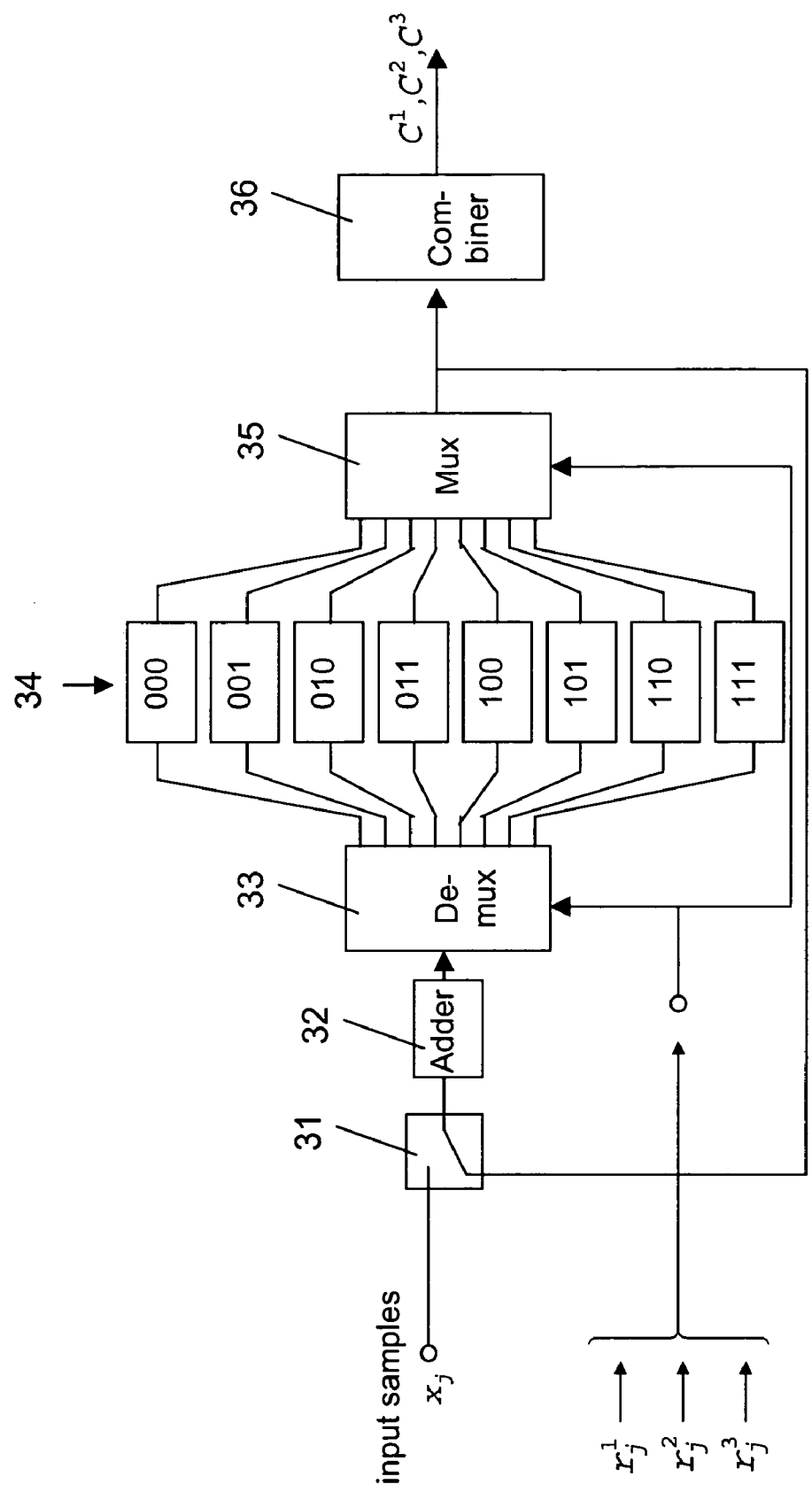
FIG. 3 is a diagram illustrating a first embodiment of the invention.

FIG. 3 illustrates the structure of a hardware-based correlator 15 for the first embodiment of the invention. The correlator 15 enables in the first embodiment a parallel correlation based on three available replica code sequences. FIG. 4 is a flow chart illustrating a corresponding parallel correlation either by software or by hardware.

In the correlator 15 of FIG. 3, an input for input samples is connected via a switch 31 and an adder 32 to a demultiplexer 33. The demultiplexer 33 is connected via a plurality of registers of a register bank 34 to a multiplexer 35. The output of the multiplexer 35 is provided on the one hand to a combiner 36 and coupled back on the other hand to a second input of the switch 31. The memory 14, which comprises at least these three replica code sequences, is connected in parallel to a control input of the demultiplexer 33 and to a control input of the multiplexer 35.

The number of the registers of the register bank 34 corresponds to the number of possible compositions of samples at the same position of the different replica sequences. The signs of the replica samples at the same position within the available replica code sequences are coded for each possible composition as binary numbers, where '0' stands for a negative sign while '1' indicates a positive sign. An exemplary binary word of (01010) would thus describe one possible composition of signs for five replica code sequences, in which the samples of the $1^{st}$, $3^{rd}$ and $5^{th}$ sequence at a specific position are −1, while the samples of the $2^{nd}$ and $4^{th}$ sequence at the same specific position are +1. The more replica code sequences are used, the more compositions are possible. If K replicas are used, then the resulting binary words will consist of K bits and the number of possible different compositions are $2^K$.

For the example of FIG. 3, which is based on three available replica code sequences, there will be eight possible compositions and thus eight different possibly binary words: (000), (001), (010), (011), (100), (101), (110), (111)

Consequently, the register bank 34 comprises eight registers. Each of these registers can be addressed by a respective one of the eight possible binary words.

For performing the correlation, consecutive samples of the received signal are provided by the receiving portion 12 as input samples to the correlator 15. For the current correlator integration cycle, the samples of the input signal are denoted as:

$x_{N-1}, x_{N-2}, \ldots, x_3, x_2, x_1, x_0$ where N is the number of samples.

At the same time, consecutive samples of replica code sequences are provided by the memory 14 to the correlator 15. For the current correlator integration cycle, the samples of the replica code sequences are denoted as:

$r_{N-1}^k, r_{N-2}^k, \ldots, r_3^k, r_2^k, r_1^k, r_0^k$ where N is again the number of samples and where $k=1, \ldots, K$ identifies the respective replica code sequence. In the example of FIG. 3, k is equal to 1, 2 or 3.

In a conventional tracking correlation, consecutive samples of the received signal are multiplied to consecutive samples of a known replica code sequence k, and the resulting products are integrated for obtaining correlation values $C^k$ for the particular iteration and thus the particular code phase according to the equation:

$$C^k = \sum_{j=0}^{N-1} r_j^k x_j$$

Compared to this conventional approach, the tracking correlation according to the first embodiment of the invention results in the same correlation values $C^k$ with a reduced amount of processing and thus a reduced complexity.

Corresponding to the above identified $2^K$ possible binary words (000) to (111) for addressing the registers, $2^K$ groups of K samples with different "sign" usage are defined, which are denoted as $J_{b_1 \ldots b_K}$. $b_1 \ldots b_K$ is the notation of signs for a respective group. In the embodiment of FIG. 3, there are thus eight groups $J_{-1-1-1}$ to $J_{+1+1+1}$, each identifying another group of samples with a specific sign usage.

The position j is defined to belong to a specific one of the groups $J_{b_1 \ldots b_K}$, if the value of the samples at position j of the K replica code sequences correspond to the values of $b_1 \ldots b_K$ of this group, i.e. $j \in J_{b_1 \ldots b_K}$, if $(r_j^1 \ldots r_j^K) = (b_1, \ldots, b_K)$.

Now, subsums of samples $S_m$ are calculated in each group according to the equation:

$$S_m = \sum_{j \in J_{b_1 \ldots b_k}} x_j,$$

where $m = (m_1, \ldots, m_K) = 0, 1, \ldots, 2^K - 1$ is reserved for indexing the groups $J_{b_1 \ldots b_K}$, with $$m_p = \begin{cases} 1 & b_p = 1 \\ 0 & b_p = -1 \end{cases} \text{ and } p = 1 \ldots K.$$

In the example of FIG. 3, the index m thus corresponds to a respective one of the above listed eight binary words (000) to (111) having the values 0 to 7. The index m thereby associates the respective subsum $S_m$ to one of the eight different groups $J_{b_1 \ldots b_K}$.

For calculating the subsum $S_m$ for each group in a new integration cycle, the correlator 15 first initializes the value in each of the $2^K$ registers of the register bank 34 to zero. Each of the register values constitutes the current value of one of the subsums $S_m$, the index m identifying the respective register. The initialization of the subsums $S_m$ is indicated as step 401 of FIG. 4.

Then, the correlator 15 receives input samples $x_j$ one after the other for forming the final subsums $S_m$. The sample $x_j$ is provided via the switch 31 to the adder 32. The samples of the three replica code sequences having the same index j are $r_j^1$, $r_j^2$ and $r_j^3$. These samples are used for controlling the demultiplexer 33 and the multiplexer 35. The demultiplexer 33 and the multiplexer 35 are able to address a respective register of the register bank 34 by selecting a register address comprising a '0' for each negative sign and a '1' for each positive sign of the applied replica code samples $r_j^1$, $r_j^2$ and $r_j^3$. For example, with $r_j^1 = -1$, $r_j^2 = +1$ and $r_j^3 = -1$, a register address (010) is selected. When the input sample $x_j$ has been forwarded to the adder 32, the multiplexer 35 provides the current value of the subsum $S_m$ in the register to which the currently selected register address is associated via the switch 31 to the adder 32. With the assumed register address (010), this is the subsum $S_{(010)}$ or $S_2$. The adder 32 adds the value of the current input sample $x_j$ to the value of the retrieved subsum $S_m$. The new sum $S_m$ is then stored again via the demultiplexer 33 into the register of the register bank 34 to which the selected register address is associated. The calculation of the subsums $S_m$ is indicated in FIG. 4 as step 402.

This procedure is performed for the current integration cycle analogously for all N input samples $x_n$.

After a respective integration cycle, the multiplexer 35 outputs the value of the subsums $S_m$ in all registers to the combining unit 36. The combining unit 36 combines all subsums $S_m$ with the values within the different groups to obtain the K correlation values $C^k$.

For the $k^{th}$ replica code sequence, with $k = 1, \ldots, K$, the correlation value is determined according to the equation:

$$C^k = \sum_{m=0}^{2^K - 1} b_{k,m} S_m$$

where for a respective value of m with $m = (m_1, \ldots, m_K)$, $b_{k,m}$ is defined to be $$b_{k,m} = \begin{cases} 1 & m_k = 1 \\ -1 & m_k = 0 \end{cases}$$

for the $k^{th}$ replica code sequence $k = 1, \ldots, K$. Thus, the value of $b_k$ depends on the replica code sequence k and on the group m for which it is needed in the sum.

In the example of FIG. 3, a dedicated correlation value $C^1$, $C^2$, $C^3$ has to be calculated for K=3 replica code sequences, and the number of groups is eight. The sum in the equation for calculating a respective correlation value thus runs from m=0 to m=7. In the third term of the sum, for instance, m is equal to 2 and corresponds as binary word to $m = (m_1, m_2, m_3) = (010)$. For the first replica code sequence, k is equal to 1 and therefore $m_k = m_1 = 0$. As consequence, $b_k$ is equal to -1. Thus, the third term of the sum for calculating the correlation value $C^1$ for the first replica code sequence is $b_k S_m = (-1)*S_2$. The other terms of the sum are determined analogously for each of the replica code sequences.

Figure 4:
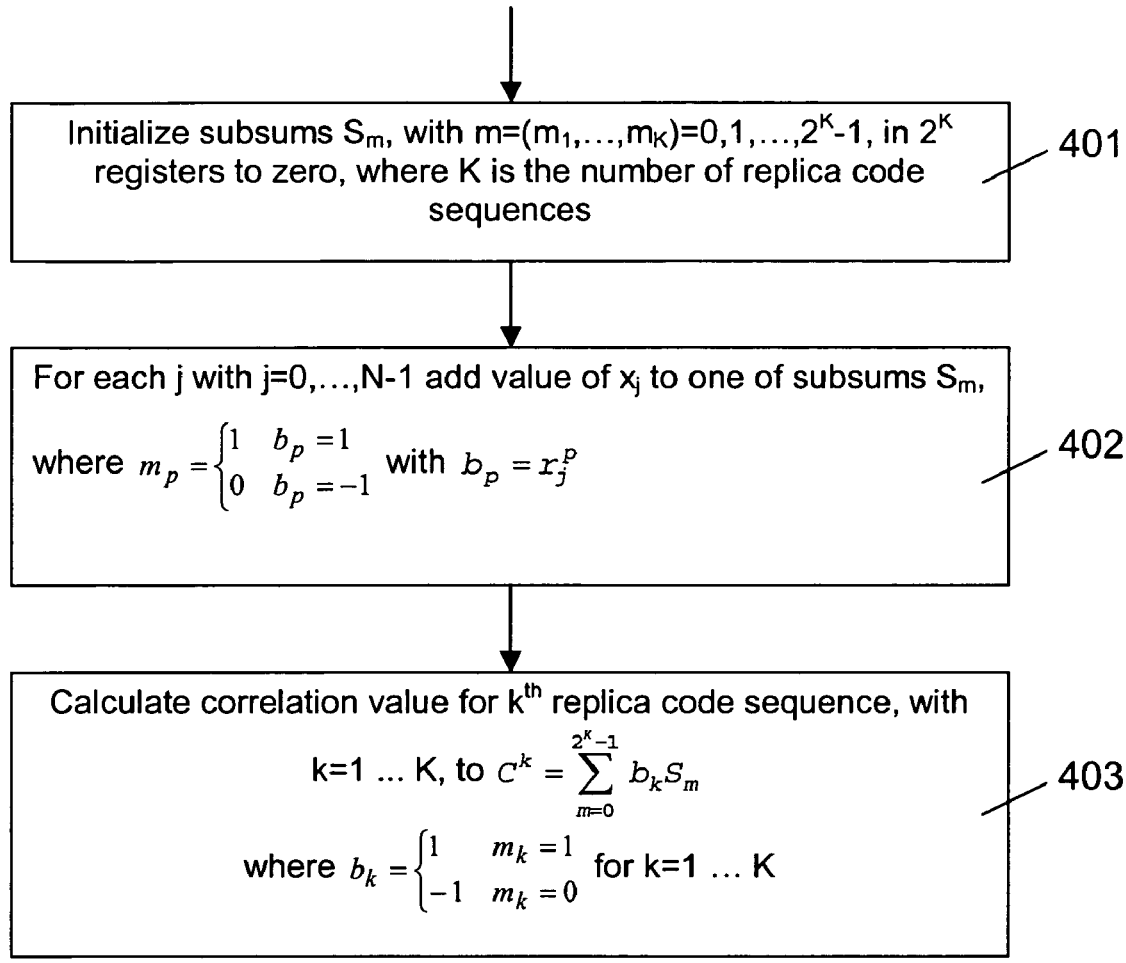
FIG. 4 is a flow chart illustrating the first embodiment of the invention.

The calculation of the correlation value $C^k$ for each replica code sequence is indicated in FIG. 4 as step 403.

Components 31 to 35 thus form a first combining portion and the combining unit 36 a second combining portion. Each register of the register bank 34 forms part of another intermediate accumulator in the first combining portion, which is used for performing a significant part of computations for all K replica code sequences at once.

The second embodiment of the invention will now be described with reference to FIGS. 5 and 6.

Figure 5:
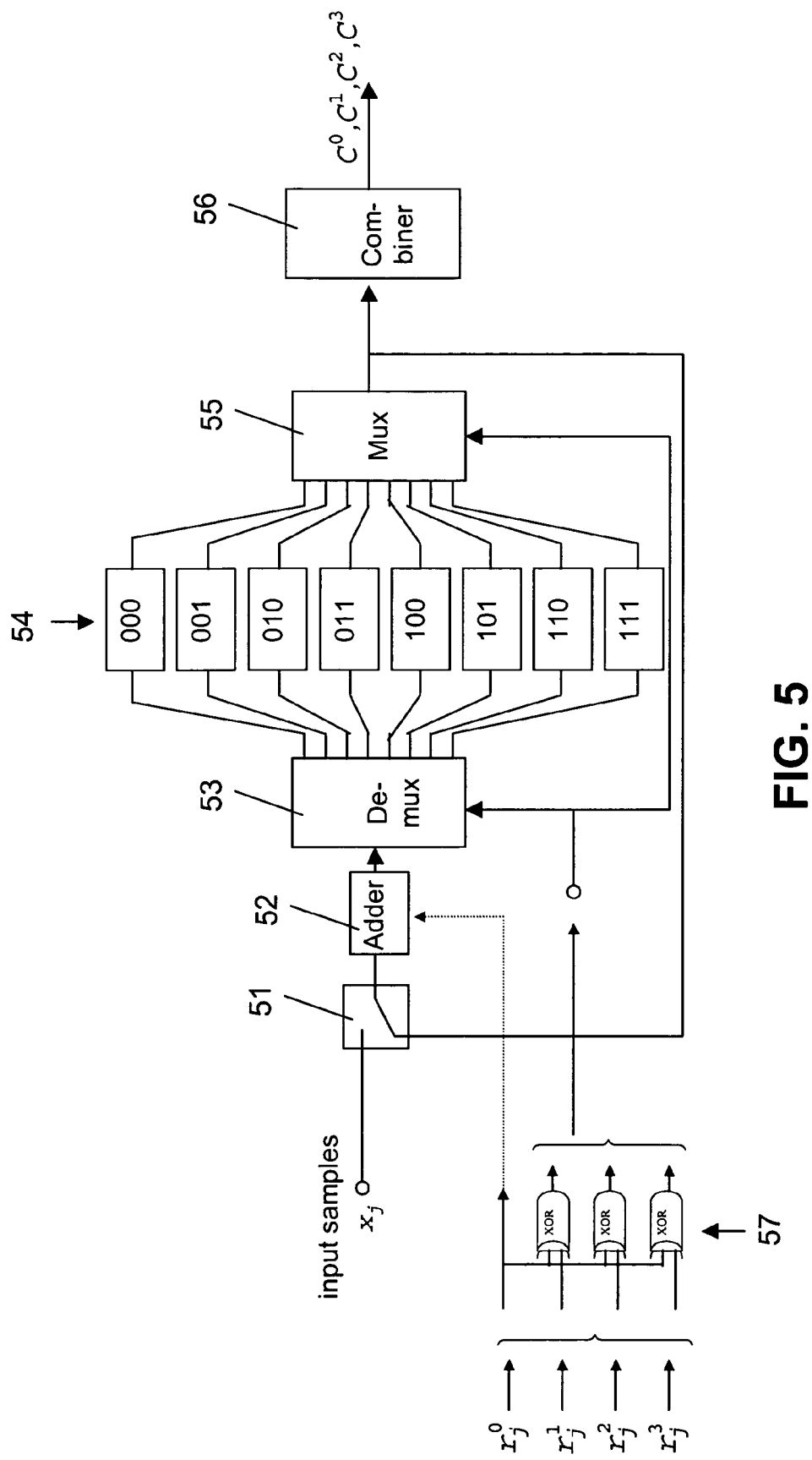
FIG. 5 is a diagram illustrating a second embodiment of the invention.

FIG. 5 illustrates the structure of a hardware-based correlator 15 for the second embodiment of the invention. The correlator 15 enables in the second embodiment a parallel correlation based on four available replica code sequences.

Figure 6:
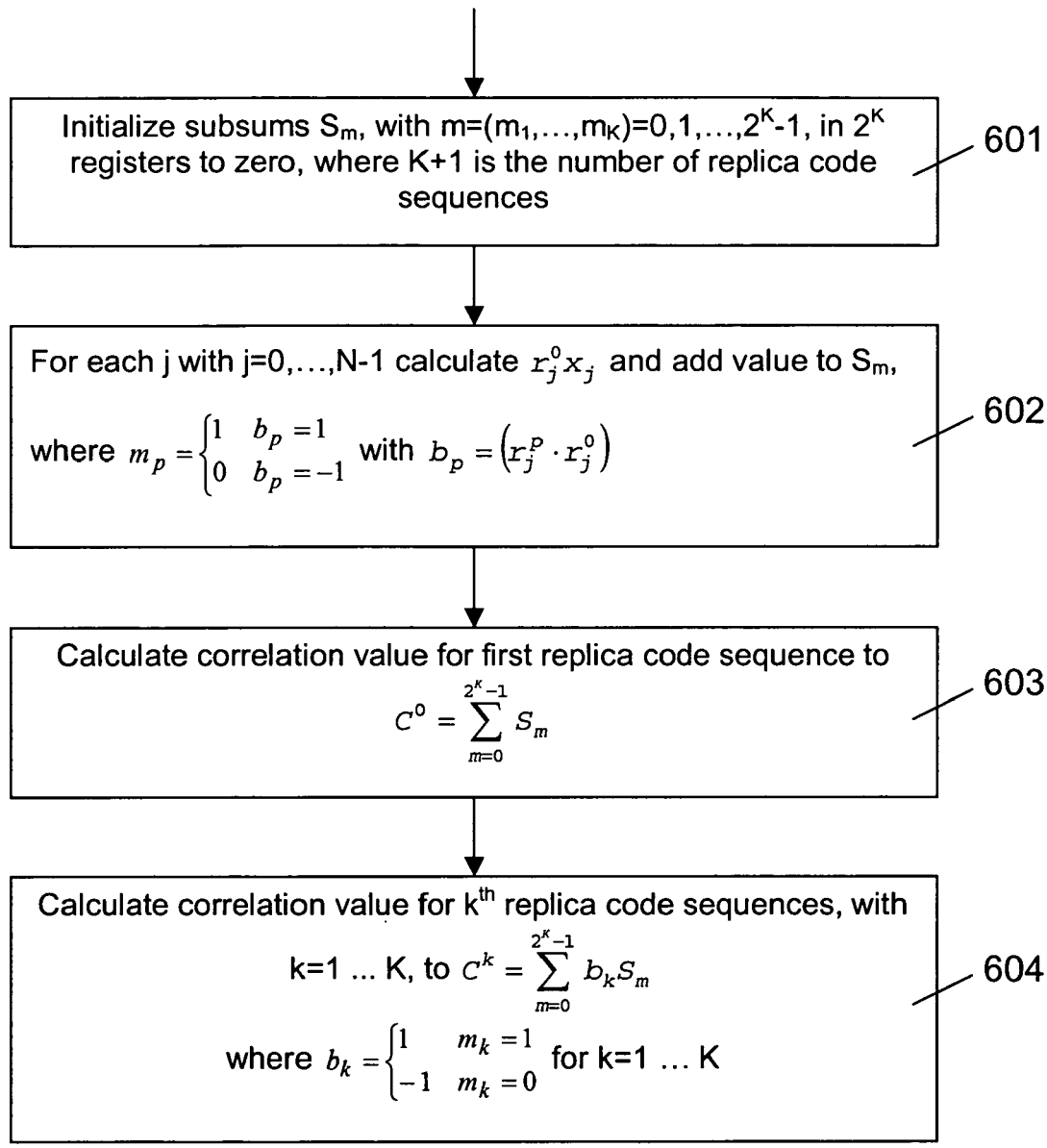
FIG. 6 is a flow chart illustrating the second embodiment of the invention.

FIG. 6 is a flow chart illustrating a corresponding parallel correlation either by software or by hardware.

The structure of the correlator 15 for the second embodiment is similar to the structure depicted in FIG. 3. It comprises a switch 51, an adder 52, a demultiplexer 53, a register 54, a multiplexer 55 and a combining unit 56 which are arranged in the same manner as in FIG. 3.

In this case, however, the memory 14 of the receiver 11 comprises at least four replica code sequences. It is connected for the first replica code sequence to the adder 52 and to a respective first input of three XOR gates of an XOR logic 57. The memory 14 is further connected for the second replica code sequence to the second input of the first XOR gate of the XOR logic 57, for the third replica code sequence to the second input of the second XOR gate of the XOR logic 57 and for the third replica code sequence to the second input of the third XOR gate of the XOR logic 57. The outputs of the of the XOR logic 57 are applied in common to the control input of the demultiplexer 53 and to the control input of the multiplexer 55.

For performing the correlation, consecutive samples of the received signal are provided by the receiving portion 12 as input samples to the correlator 15. For the current correlator integration cycle, the samples of the input signal are denoted again as:

$x_{N-1}, x_{N-2}, \ldots x_3, x_2, x_1, x_0$ where N is the number of samples.

At the same time, consecutive samples of replica code sequences are provided by the memory 14 to the correlator 15. For the current correlator integration cycle, the samples of the replica code sequences are denoted as:

$r_{N-1}^k, r_{N-2}^k, \ldots, r_3^k, r_2^k, r_1^k, r_0^k$ where N is again the number of samples and where k=0, . . . , K identifies a respective replica code sequence, k=0 being reserved for the first replica code sequence. In the example of FIG. 5, K is equal to three.

The number of registers of the register bank corresponds to the number of possible compositions of sign changes when comparing a sample at a specific position of a first replica signal to a sample at the same position of a respective one of the further replica signals. More specifically, the sign changes in the samples of the further replica code sequences are coded for each possible composition as binary numbers, where '0' stands for no change of sign while '1' indicates a change of sign compared to the sample at the same position of the first replica code sequence. An exemplary binary word of (01010) would thus describe a possible composition of sign changes for six available replica code sequences, in which the samples of the $2^{st}$, $4^{rd}$ and $6^{th}$ sequence at a specific position are equal to the sample of the $1^{st}$ sequence at the same position, while the sampled of the $3^{nd}$ and $5^{th}$ sequence at this position are different from the sample of the $1^{st}$ sequence at this position. The more replica code sequences are used, the more compositions of sign changes are possible. If K+1 replica code sequences are used, then the binary words will consist of K bits and the number of possible different compositions are $2^K$. For the example of FIG. 5, which is based on four available replica code sequences, there will be eight possible compositions of sign changes and thus eight different possible binary words:

(000), (001), (010), (011), (100), (101), (110), (111)

Thus, the register bank comprises eight registers. Each of these registers can be addressed by another one of the eight possible binary words.

As mentioned above, in a conventional tracking correlation, the correlation values e are calculated according to the equation:

$$C^k = \sum_{j=0}^{N-1} r_j^k x_j$$

Also in the tracking correlation according to the second embodiment of the invention, the amount of processing required for obtaining the correlation values $C^k$ is reduced without approximations.

Corresponding to the above identified $2^K$ possible binary words (000) to (111) for addressing the registers, $2^K$ groups of K samples with different "sign" changes are defined, which are denoted as $J_{b_1 \ldots b_K}$. $b_1 \ldots b_K$ is the notation of sign changes with respect to the first replica code sequence for a respective group, i.e. $b_p = (r_j^p \cdot r_j^0)$ with p=1 . . . K. In the second embodiment illustrated in FIG. 5, there are thus eight groups $J_{-1-1-1}$ to $J_{+1+1+1}$, each identifying a group of samples with similar sign change behavior.

The position j is defined to belong to a specific one of the groups $J_{b_1 \ldots b_K}$, if the sign changes of the samples at position j of the K last replica code sequences compared to the sample at position j of the first replica code sequence correspond to the values of $b_1 \ldots b_K$ of this group, i.e. $j \in J_{b_1 \ldots b_K}$, if $(r_j^0 r_j^1 \ldots r_j^K) = \pm(1, b_1, \ldots, b_K)$.

Now, subsums $S_m$ are calculated in each group according to the equation:

$$S_m = \sum_{j \in J_{b_1 \ldots b_k}} r_j^0 x_j$$

where m=$(m_1, \ldots, m_K)$=0, 1, . . . , $2^K-1$ is reserved for indexing the groups $J_{b_1 \ldots b_K}$ with $$m_p = \begin{cases} 1 & b_p = 1 \\ 0 & b_p = -1 \end{cases} \text{ and } p = 1 \ldots K.$$

Thus, in the example of FIG. 5, the index m corresponds to a respective one of the above listed eight binary words (000) to (111) having the values 0 to 7. The index m thereby associates the respective sum $S_m$ to one of the eight different groups $J_{b_1 \ldots b_K}$.

For calculating the subsum $S_m$ for each group for a new integration cycle, also the correlator 15 of the second embodiment first initializes the values in each of the $2^K$ registers to zero. Each of the register values constitutes the current value of one of the subsums $S_m$, the index m identifying the respective register. This is indicated as step 601 of FIG. 6.

Then, the correlator 15 receives input samples $x_j$ one after the other for forming the final subsums $S_m$. The respective sample $x_j$ is provided via the switch 51 to the adder 52. The samples of the four replica code sequences having the same index j are $r_j^0$, $r_j^1$, $r_j^2$ and $r_j^3$. The sample $r_j^0$ of the first replica code sequence is equally provided to the adder 52. Here, the input sample $x_j$ is multiplied with the sample $r_j^0$ of the first replica code sequence at the same position j.

Further, a register address is generated by combining the sample of the first replica code sequence separately with each of the samples of the further replica code sequence at position j. In the example of FIG. 5, this is achieved by means of the XOR logic 57. The XOR logic 57 outputs a value '0' for each sample of the second to fourth replica code sequence at position j which is equal to the sample of the first replica code sequence at position j and a '1' for each sample of the second to fourth replica code sequence at position j which is different from the sample of the first replica code sequence at position j. The samples of the four replica code sequences having the same index j may be for example $r_j^0=+1, r_j^1=+1, r_j^2=-1, r_j^3=+1$. These samples are converted by the XOR logic 57 into a register address (010).

The obtained register address is used for controlling the demultiplexer 53 and the multiplexer 55, which are able to address a respective register of the register bank 54 with a received register address.

The multiplexer 55 retrieves the current value of the subsum $S_m$ for the corresponding group, e.g. $S_{(010)}$ or $S_2$, from the register of the register bank 54 to which the obtained register address is associated. This subsum $S_m$ value is equally provided via the switch 51 to the adder 52. The adder 52 adds the determined product $r_j^0 x_j$ to the received subsum $S_m$.

The new subsum $S_m$ is then stored again via the demultiplexer 53 into the register of the register bank 54 to which the selected register address is associated. The calculation of the subsums $S_m$ is indicated in FIG. 6 as step 602.

This procedure is performed for the current integration cycle analogously for all N input samples $x_n$.

After a respective integration cycle, the multiplexer 55 outputs the value of the subsums $S_m$ in all registers to the combining unit 56. The combining unit 56 then combines all subsums $S_m$ to obtain the K+1 correlation values $C^k$.

For the first replica code sequence, the correlation value $C^0$ is simply calculated as the sum of all subsums $S_m$:

$$C^0 = \sum_{m=0}^{2^K-1} S_m$$

This is indicated in FIG. 6 as step 603.

For the $k^{th}$ replica code sequence, with k=1, ..., K, the respective sign change in each group is taken into account. The correlation value $C^k$ is calculated to be:

$$C^k = \sum_{m=0}^{2^K-1} b_{k,m} S_m,$$

where for a respective value of m with m=$(m_1, ..., m_K)$, $b_{k,m}$ is defined to be $$b_{k,m} = \begin{cases} 1 & m_k = 1 \\ -1 & m_k = 0 \end{cases}$$

for the $k^{th}$ replica code sequence k=1, ..., K. Thus, the respective value of $b_k$ depends again on the replica code sequence k and on the group m for which it is needed in the sum.

The calculation of the correlation values $C^k$ for the last K replica code sequences, which corresponds to the calculation of the K correlation value $C^k$ in the first embodiment, is indicated in FIG. 6 as step 604.

With the two above described exemplary embodiments, it becomes apparent that it is not necessary to perform a tracking correlation for each replica code sequence using all the received signal samples. It is sufficient to calculate once a subsum for various groups of received signal samples, and then to combine these subsums differently. Since the subsums can be the same for all replica code sequences, a reduction of the computational load can be achieved.

It is to be understood that in the described embodiments the different replica code sequences can also be different, possibly overlapping sections of a single, larger replica code sequence.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all compositions of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for supporting a correlation based tracking of a code modulated signal received at a receiver, wherein samples of said received signal and samples of at least one available replica code sequence are aligned to each other and wherein positions of said samples in said received signal and in said at least one replica code sequence are grouped, each group comprising all positions at which the composition of values of the samples of all of said at least one replica code sequence is similar, said method comprising:
    combining the values of the samples of said received signal which are associated by their positions to a respective group separately for each group to obtain a respective intermediate result; and
    determining a correlation value for each of said at least one replica code sequence by combining obtained intermediate results for all groups separately for each of said at least one replica sequence taking into account the values of the samples of said at least one replica sequence in the respective group.

2. The method according to claim 1,
    wherein each group comprises all positions at which the composition of the values of the samples of all of said at least one replica code sequence is identical;
    wherein the values of the samples of said received signal which are associated by their positions to a respective group are combined within each group by summing the values of the samples of said received signal within each group to obtain said intermediate result for each group; and
    wherein said intermediate results for all groups are combined separately for each of said at least one replica sequence by multiplying the value of the samples of a respective replica code sequence in a respective group with the intermediate result determined for this particular group and by summing the multiplication results for the respective replica code sequence for all groups.

3. The method according to claim 2, wherein the number of current samples of said received signal and the number of samples of each of said at least one replica code sequence is N, and wherein the number of available replica code sequences is K;

wherein the employed code is a binary code using sample values of +1 and −1, the current samples of said received signal being denoted as: $x_{N-1}, x_{N-2}, \ldots, x_3, x_2, x_1, x_0$ and the samples of said at least one replica code sequences being denoted as: $r_{N-1}^k, r_{N-2}^k, \ldots, r_3^k, r_2^k, r_1^k, r_0^k$ with k=1 to K;

wherein $2^K$ groups $J_{b_1 \ldots b_K}$ are defined, $b_1 \ldots b_K$ being the notation of signs of the samples of said at least one replica code sequence, which samples are associated by their position to a respective group, and wherein a sample of said received signal at a specific position j is associated to a specific group $J_{b_1 \ldots b_K}$, if $(r_j^1 \ldots r_j^K) = (b_1, \ldots, b_K)$;

wherein said intermediate result for each group is determined to be $$S_m = \sum_{j \in J_{b_1 \ldots b_K}} x_j,$$

where $m=(m_1, \ldots, m_K)=0, 1, \ldots, 2^K-1$ is reserved for indexing the groups $J_{b_1 \ldots b_K}$ with $$m_p = \begin{cases} 1 & b_p = 1 \\ 0 & b_p = -1 \end{cases} \text{ and } p = 1 \ldots K;$$

and wherein for the $k^{th}$ replica code sequence, with k=1, . . . , K, the correlation value is determined to be $$C^k = \sum_{m=0}^{2^K-1} b_{k,m} S_m,$$

where for each $m=(m_1, \ldots, m_K)$, $b_{k,m}$ is defined to be $$b_{k,m} = \begin{cases} 1 & m_k = 1 \\ -1 & m_k = 0 \end{cases}$$

for said $k^{th}$ replica code sequence.

4. The method according to claim 1, wherein said at least one replica code sequence comprises at least two replica code sequences;

wherein each group comprises all positions at which the composition of the differences between the values of the samples of all of said replica code sequences except for one selected replica code sequence and the value of the sample of said selected replica code sequence is identical;

wherein the values of the samples of said received signal which are associated by their positions to a respective group are combined within each group by multiplying the value of each sample at a particular position in said received signal with the value of the sample at said particular position in said selected replica code sequence, and by adding all resulting products within one group to obtain said intermediate result for each group;

wherein a correlation value for said selected replica code sequence is determined by summing the intermediate results of all groups; and wherein a correlation value for any other replica sequence than said selected replica sequence is determined by combining the difference between the value of the samples of the respective replica code sequence in a particular group and the value of the samples of the selected replica code signal in this particular group with the intermediate result determined for this particular group, and by summing the resulting values for all groups.

5. The method according to claim 4, wherein the number of current samples of said received signal and the number of samples of each of said at least two replica code sequences is N, and wherein the number of available replica code sequences is K+1;

wherein the employed code is a binary code using sample values of +1 and −1, the current samples of a received signal being denoted as: $x_{N-1}, x_{N-2}, \ldots, x_3, x_2, x_1, x_0$ and the samples of the replica code sequences being denoted as: $r_{N-1}^k, r_{N-2}^k, \ldots, r_3^k, r_2^k, r_1^k, r_0^k$ with k=0 to K;

wherein $2^K$ groups $J_{b_1 \ldots b_K}$ are defined, $b_1 \ldots b_K$ being a notation of sign changes of the samples of said replica code sequences except for a first one of said replica code sequences compared to the samples of said first replica code sequence for a respective group, all samples being associated by their position to a respective group, and wherein a sample of said received signal at a specific position j is part of a group $J_{b_1 \ldots b_K}$, if $(r_j^0 r_j^1 \ldots r_j^K) = \pm(1, b_1, \ldots, b_K)$;

wherein said intermediate result for each group is determined to be $$S_m = \sum_{j \in J_{b_1 \ldots b_K}} r_j^0 x_j,$$

where $m=(m_1, \ldots, m_K)=0, 1, \ldots, 2^K-1$ is reserved for indexing the groups $J_{b_1 \ldots b_K}$ with $$m_p = \begin{cases} 1 & b_p = 1 \\ 0 & b_p = -1 \end{cases} \text{ and } p = 1 \ldots K;$$

wherein for said first replica code sequence, the correlation value is determined to be $$C^0 = \sum_{m=0}^{2^K-1} S_m;$$

and wherein for the $k^{th}$ replica code sequence, with k=1, . . . , K, the correlation value is determined to be $$C^k = \sum_{m=0}^{2^K-1} b_{k,m} S_m,$$

where for each $m=(m_1, \ldots, m_K)$, $b_{k,m}$ is defined to be $$b_{k,m} = \begin{cases} 1 & m_k = 1 \\ -1 & m_k = 0 \end{cases}$$

for the $k^{th}$ replica code sequence.

6. The method according to claim 1, wherein it is determined whether a sample at a particular position in said received signal is associated by its position to a particular group by evaluating the composition of the values of the samples of said at least replica code sequence at said particular position.

7. The method according to claim 6, wherein the employed code is a binary code, and wherein said composition of the values of the samples of said at least replica code sequence at said particular position is evaluated by means of an XOR logic.

8. The method according to claim 1, wherein said signal received at a receiver is a signal transmitted by a satellite of a satellite positioning system.

9. A processing unit supporting a correlation based tracking of a code modulated signal received at a receiver, wherein samples of said received signal and samples of at least one available replica code sequence are aligned to each other and wherein the positions of said samples in said received signal and in said at least one replica code sequence are grouped, each group comprising all positions at which the composition of the values of the samples of all of said at least one replica code sequence is similar, said unit comprising:
   a first combining portion for combining the values of the samples of a received signal which are associated by their positions to a respective group separately for each group to obtain a respective intermediate result; and
   a second combining portion for determining a correlation value for each of said at least one replica code sequence by combining intermediate results provided by said first combining portion for all groups separately for each of said at least one replica sequence taking into account the values of the samples of said at least one replica sequence in the respective group.

10. The processing unit according to claim 9, wherein said processing unit is a tracking correlator.

11. The processing unit according to claim 9, wherein said processing unit is said receiver receiving said code modulated signal.

12. The processing unit according to claim 9, wherein said processing unit is adapted to receive said samples of a signal received at said receiver from said receiver.

13. A system enabling a correlation based tracking of a code modulated signal received at a receiver, wherein samples of said received signal and samples of at least one available replica code sequence are aligned to each other and wherein the positions of said samples in said received signal and in said at least one replica code sequence are grouped, each group comprising all positions at which the composition of the values of the samples of all of said at least one replica code sequence is similar, said system comprising:
   a first combining portion for combining the values of the samples of a received signal which are associated by their positions to a respective group separately for each group to obtain a respective intermediate result; and
   a second combining portion for determining a correlation value for each of said at least one replica code sequence by combining intermediate results provided by said first combining portion for all groups separately for each of said at least one replica sequence taking into account the values of the samples of said at least one replica sequence in the respective group.

14. A software program product in which a software code for supporting a correlation based tracking of a code modulated signal received at a receiver is stored, wherein samples of said received signal and samples of at least one available replica code sequence are aligned to each other and wherein positions of said samples in said received signal and in said at least one replica code sequence are grouped, each group comprising all positions at which the composition of values of the samples of all of said at least one replica code sequence is similar, said software code realizing the following steps when running in a processing unit:
   combining the values of the samples of said received signal which are associated by their positions to a respective group separately for each group to obtain a respective intermediate result; and
   determining a correlation value for each of said at least one replica code sequence by combining obtained intermediate results for all groups separately for each of said at least one replica sequence taking into account the values of the samples of said at least one replica sequence in the respective group.

* * * * *